(12) United States Patent
Levin

(10) Patent No.: US 6,863,012 B2
(45) Date of Patent: Mar. 8, 2005

(54) VIBRATING DEVICE FOR REPELLING BIRDS FROM BOATS

(76) Inventor: David M. Levin, Postal Drawer 4195, Sarasota, FL (US) 34230

(*) Notice: Subject to any disclaimer, the term of this patent is extended or adjusted under 35 U.S.C. 154(b) by 0 days.

(21) Appl. No.: 10/176,433

(22) Filed: Jun. 19, 2002

(65) Prior Publication Data

US 2003/0233970 A1 Dec. 25, 2003

(51) Int. Cl.[7] .................................................. B63B 9/00
(52) U.S. Cl. ........................................ 114/221 R; 52/101
(58) Field of Search ............................ 114/221 R, 255; 441/1; 52/101

(56) References Cited

U.S. PATENT DOCUMENTS

| | | | | | |
|---|---|---|---|---|---|
| 3,292,319 A | * | 12/1966 | McCarthy | ................... | 52/101 |
| 4,366,562 A | * | 12/1982 | McGinty | ................... | 367/139 |
| 5,058,335 A | * | 10/1991 | Richter | ................... | 52/101 |
| 5,341,759 A | * | 8/1994 | Hood | ................... | 114/255 |
| 5,476,062 A | * | 12/1995 | Ondris et al. | ................... | 114/343 |
| 5,966,075 A | * | 10/1999 | Blanks | ................... | 340/573.2 |
| 6,003,471 A | * | 12/1999 | Ohba | ................... | 119/713 |

\* cited by examiner

*Primary Examiner*—Jesus D. Sotelo
(74) *Attorney, Agent, or Firm*—Dorothy S. Morse

(57) ABSTRACT

A device that deters and repels birds from landing on masts, spreaders, rigging and attached apparatus of sailboats, as well as towers and outriggers of power boats. The device generates an intermittent, quiet vibration that is transmitted to the boat. The combination of intermittent vibration and movement of the device results in stimuli that are unpleasant for birds. Birds attempting to perch upon a sailboat are deterred by the movement of the device and are otherwise repelled by the unsettling vibration transmitted through those parts of the boat usually used as perches.

20 Claims, 3 Drawing Sheets

VIBRATING DEVICE FOR REPELLING BIRDS FROM BOATS

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

The present invention relates to devices intended to prevent birds from landing on the top of masts, on spreaders, and on the rigging of sailboats. The present invention can also be utilized to repel birds from the outriggers and elevated towers of power boats.

Roosting birds are attracted to the elevated appurtenances of marine vessels moored in anchorages and at docks and marinas. The droppings of these birds upon boats creates both an aesthetic nuisance and a potential health hazard.

Boaters must spend countless hours cleaning up the mess caused by birds and often find it necessary to repair damage that the droppings have caused to the boat's finish.

Numerous devices have been utilized in an effort to deter birds from landing on boats. Among these are imitation predators such as owls, snakes, and ravens; painted balloons; reflective streamers; small flags; and noise makers.

Some of these devices have even received U.S. Patents. See, for example, U.S. Pat. Nos. 3,292,319; 5,058,335; 5,341,759; 5,615,524; 5,974,998; and 6,082,285.

For reasons as numerous as the number of ineffective devices employed, no device has proven successful in repelling and deterring birds from landing on the elevated portions of marine vessels. Roasting birds become accustomed to inanimate "scarecrow" devices.

Some devices have been successful in preventing birds from roasting on some areas of the boat, but the birds simply land on those areas beyond the reach of the devices.

Noise makers may be successful in scaring birds, but create a nuisance for those humans within earshot.

Thus, there is a need for an effective, quiet mechanism for permanently repelling and deterring birds from landing on all elevated portions of marine vessels.

BRIEF SUMMARY OF THE INVENTION

The present invention represents a novel approach to permanently repelling and deterring birds from landing on all elevated portions of marine vessels. The invention consists of a device which is hauled to the top of the mast of a sailboat or attached either singularly or in tandem with other units to boat towers and outriggers.

The device contains an unbalanced motor which generates a vibration that is transmitted through the device to the mast of a sailboat, or to boat towers and outriggers.

The vibration caused by the device is further transmitted to the rigging, spreaders, and equipment attached to the top of the mast of a sailboat, and to the rigging associated with boat outriggers.

The combination of the movement of the device as it vibrates and the vibration of the mast, mast rigging, spreaders, and equipment attached to the top of the mast of a sailboat, and of the boat tower, outriggers, and the rigging associated with boat outriggers, deters and repels birds.

That portion of the device which comes into contact with the mast, boat tower, or outrigger is composed of material which effectively transmits the vibration but creates little noise.

The device is controlled by a switch which creates an intermittent vibration that reduces the potential for acclimation by the targeted birds. The switch also automatically turns the device on during daylight and off at night, so that the device only operates during the period of time when boats are most likely to be affected by the birds.

By creating a startling, intermittent vibration that is transmitted along all of those areas of the boat upon which birds have a tendency to land, the present invention is a more effective means of repelling and deterring birds from landing on marine vessels than those devices heretofore created.

Other advantages and novel features of the invention will be set forth in the description which follows, and will become apparent to those skilled in the art upon examination of the following more detailed description and drawings. In the drawings and description, numerals indicate the various features of the invention, like numerals referring to like features throughout both the drawings and description.

DETAILED DESCRIPTION OF THE INVENTION

Figures 1, 1A:
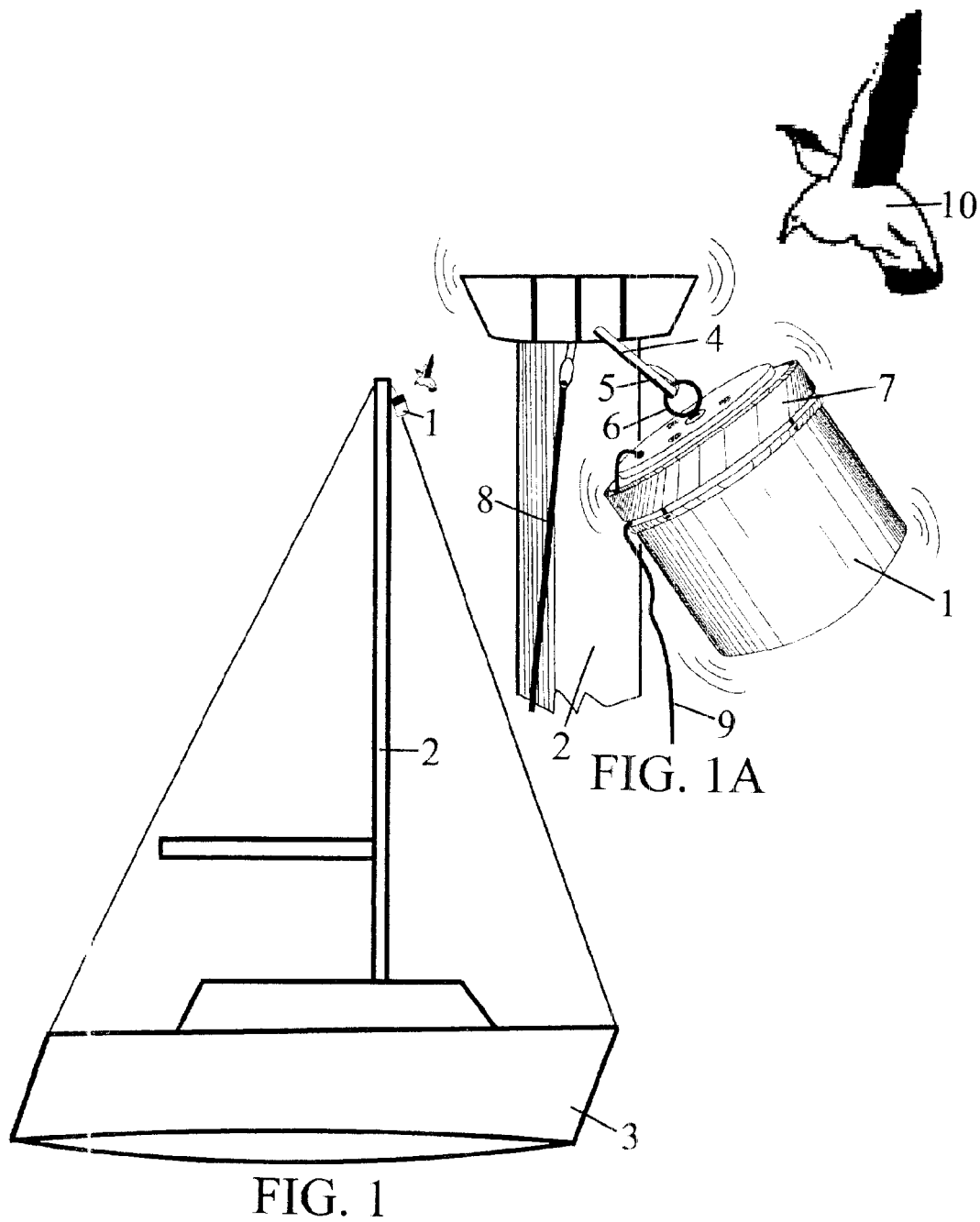
FIG. 1 is a schematic view of a sailboat employing the invention to repel and deter birds from landing on the mast, spreaders, rigging, or masthead appendages.
FIG. 1A is a close-up view of the invention in operation.

FIG. 1 depicts the preferred embodiment of the invention 1 in its operating position at the top of the mast 2 of a typical sailboat 3.

FIG. 1A shows the vibrating invention 1 after it has been hauled into its operating position by means of an available halyard 4.

The vibrating invention 1 is held to the halyard 4 by means of a shackle 5 which attaches to an eye-bolt 6 through the top of the vibrating invention 1.

Vibrations caused by an unbalanced motor within the vibrating invention 1 are transmitted to the mast 2 and rigging 8 through a rubber (or synthetic rubber) collar 7 which is the only point of contact with the mast 2.

The vibrating invention 1 is powered by an electrical cord 9 which runs down into the cabin of the sailboat 3.

The vibration and movement of the invention 1 frightens the bird 10 and deters the bird from landing on the mast 2 or rigging 8.

Figure 2:
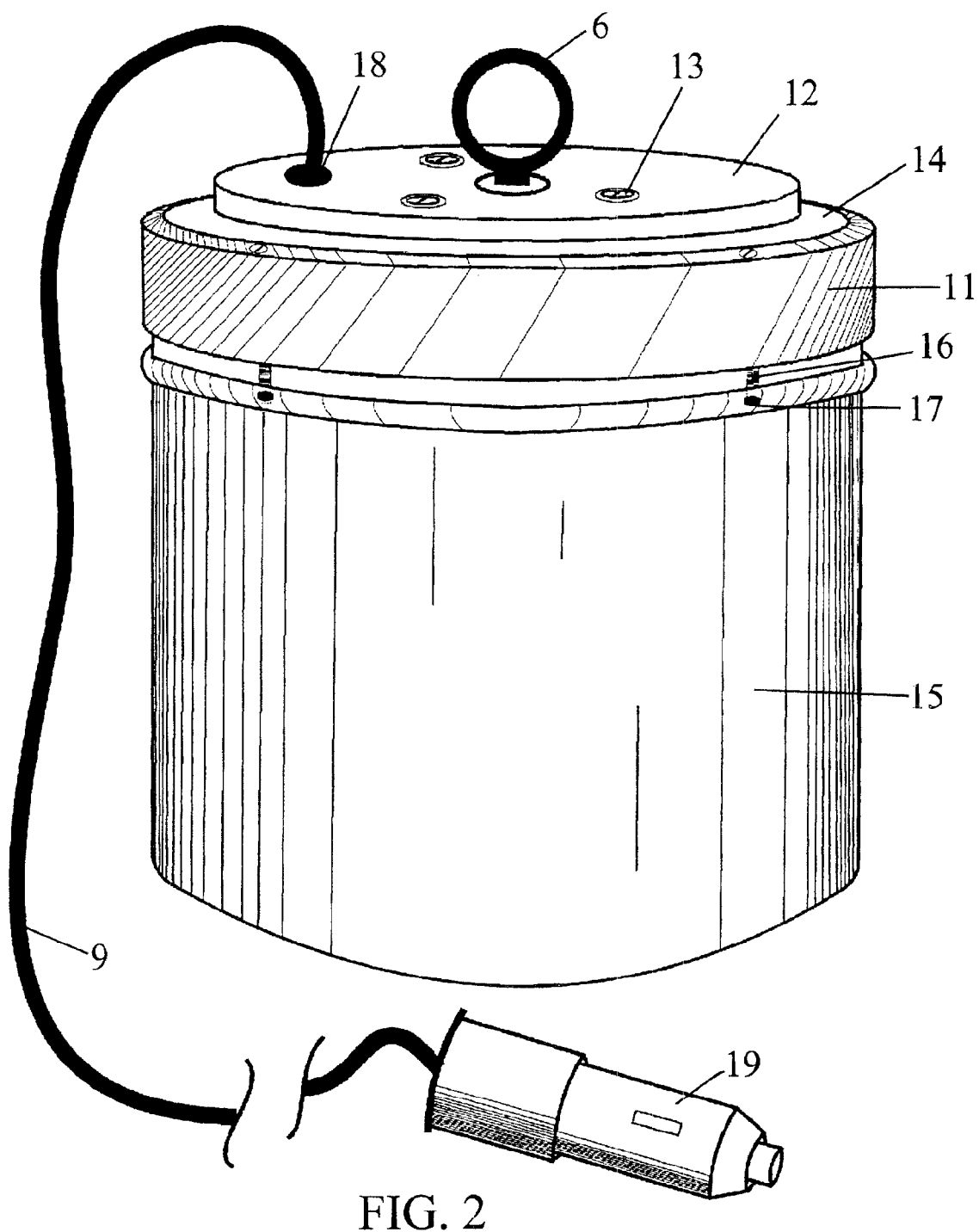
FIG. 2 is a perspective view of the instant invention.

As depicted in FIG. 2, the preferred embodiment is a cylindrical device with approximate exterior dimensions of 7.5 inches in height (excluding 2-inch eye bolt 6) and 7 inches in diameter.

A 1.5-inch thick rubber (or synthetic rubber) collar 11 is sandwiched between two polyethylene disks 12 secured together by 3 bolts 13 fastened with nylon lock nuts forming the "collar unit" 14.

A 2-inch diameter eye bolt 6 is installed through the middle of the collar unit 14 and secured by a lock washer and nut.

A translucent cylindrical polypropylene housing 15 is fastened to the underside of the collar unit 14 by 4 bolts 16 each secured by a nylon lock nut 17.

A low voltage power cord 9 is inserted through an opening 18 in the top of the collar unit 14. The opening 18 is sealed with silicon sealant.

The arrangement of the power cord 9 as shown in FIG. 2 is for illustration purposes only. In actual use, the power cord 9 would be inserted through openings in the top and bottom of the rubber (or synthetic rubber) collar 11. This arrangement would protect the power cord 9 from damage while the device is in its vibrating mode.

The power cord 9 would be long enough, typically 75 feet, to extend from the top of the mast 2 to the 12-volt DC power supply within the cabin of the boat.

A 12-volt DC plug 19 is attached to the end of the power cord 9. When the device is in use, the plug 19 would be inserted into a 12-volt DC receptacle within the boat's cabin. Alternatively, battery clips could be attached to the end of the power cord 9 which can then be connected directly to the boat's batteries when the device is to be used.

Figure 3:
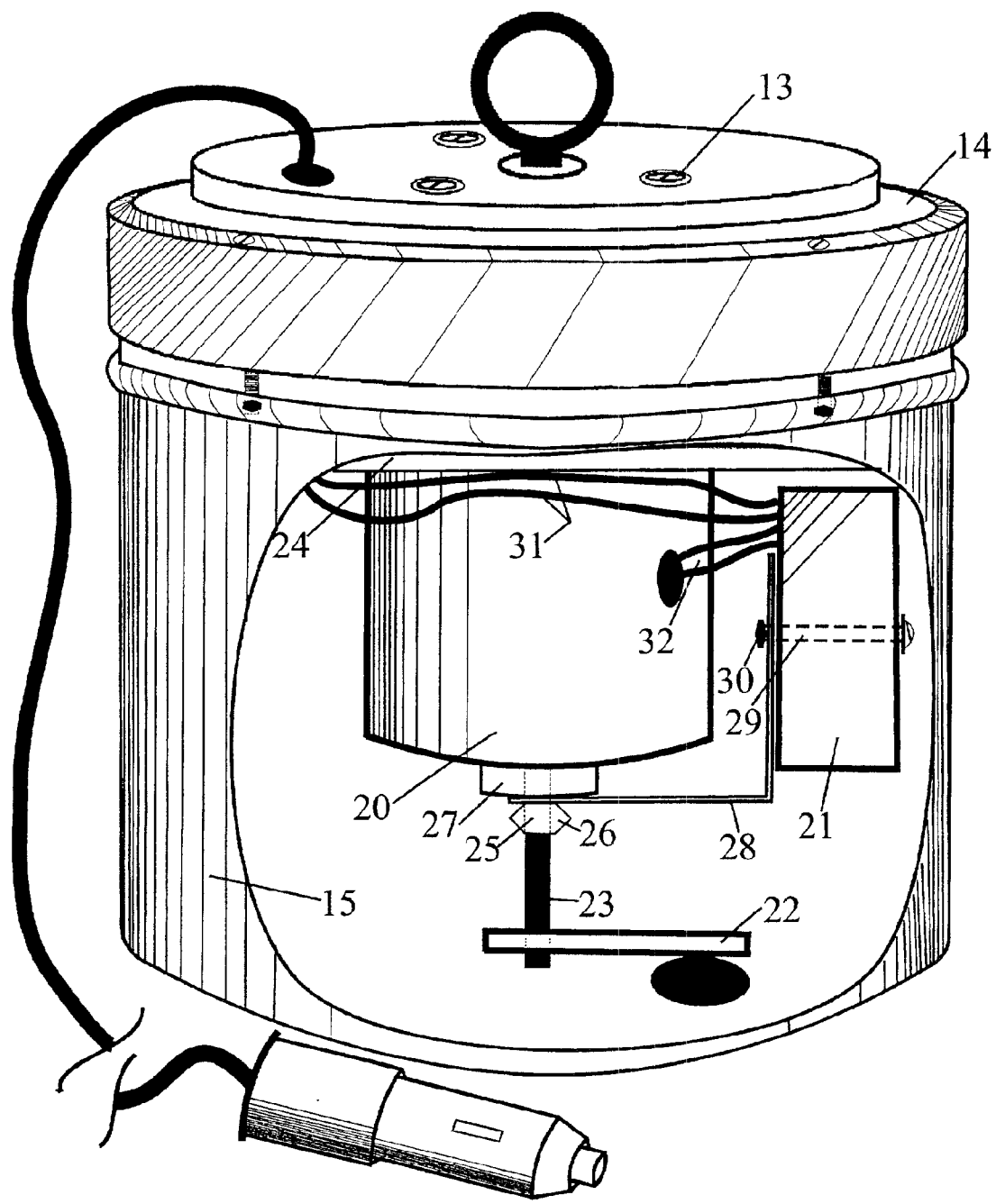
FIG. 3 is a partial cut-away view of the instant invention.

As depicted in FIG. 3, the translucent cylindrical housing 15 protects the vibratory 20 and the controlling unit 21.

The vibrations are created by a 12-volt DC motor 20 which has an eccentric weight 22 attached to its shaft 23.

The vibratory motor 20 is attached to a polyethylene disk 24 by two opposing bolts 25 each secured by a nylon lock nut 26.

The disk 24 to which the vibratory motor 20 is attached is itself secured to the underside of the collar unit 14 by the same 3 bolts 13 which hold the collar unit 14 together.

Before being secured by a nylon lock nut 26, the bolts 25 securing the vibratory motor 20 to the polyethylene disk 24 each pass through a nylon spacer 27. and a metal "L" bracket 28.

The controlling unit 21 is secured to the two metal "L" brackets 28 by two bolts 29 which are fastened by nylon lock nuts 30.

The controlling unit 21 is a light controlled repeat cycle timer. The controlling unit 21 is equipped with a photocell which turns the unit on when sunlight is present and turns the unit off when ambient conditions become dark.

When the controlling unit 21 is activated, the vibratory motor 20 is energized for 15 seconds, and then turned off for 30 seconds. This cycle repeats continuously until the controlling unit 21 is deactivated by lack of sunlight.

Positive and negative leads 31 connect the controlling unit 21 to the power cord 9. Positive and negative leads 32 connect the controlling unit 21 to the vibratory motor 20.

It is understood that changes in details, materials, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. It is to be understood that no limitation with respect to the specific apparatus illustrated herein is intended or should be inferred.

What is claimed is:

1. A vibrating device that repels an deters birds from landing on the mast, spreaders, rigging, masthead appendages, towers, and outriggers of sailboats and power boats, wherein the vibrations thereof are generated by an internal unbalanced vibratory motor and wherein said vibrator motor is controlled by a light controlled repeat cycle timer having a photocell that turns said timer on when sunlight is present and turns said timer off when ambient conditions become dark.

2. The device of claim 1 wherein said light controlled repeat cycle timer is energized for 15 seconds, and then turned off for 30 seconds and repeats this cycle continuously until said timer is deactivated by lack of sunlight.

3. The device of claim 1 wherein said vibrations caused by said vibratory motor are transmitted to the masts, spreaders, rigging, masthead appendages, towers, and outriggers of sailboats and power boats through a resilient collar.

4. The device of claim 3 wherein said resilient collar is selected from a group consisting of rubber collars and synthetic rubbers collars.

5. The device of claim 1 wherein said vibratory motor and said light controlled repeat cycle timer are powered by 12-volt direct current supplied by onboard boat batteries.

6. The device of claim 1 further comprising a power cord connected to said vibratory motor and said light controlled repeat cycle timer, and wherein said power cord has connection means to onboard boat batteries selected from a group consisting of 12-volt direct current plugs configure and dimensioned to fit into a 12-volt receptacle and battery clips which can be connected directly to onboard boat batteries.

7. The device of claim 1 further comprising a housing and wherein said housing is translucent and said photocell is positioned within said housing.

8. The device of claim 1 further comprising housing and wherein said housing is translucent and configured to protect said internal vibratory motor and said light controlled repeat cycle timer from weathering elements.

9. The device of claim 1 further comprising a housing tethered to a selected attachment point on the boat with which it is associated for deterring and repelling birds whereby said housing is in vibratory contact with the mast and any spreaders, rigging, masthead appendages, towers, and outriggers on the boat, and wherein said internal vibratory motor and said light controlled repeat cycle timer are positioned within said housing, and further wherein said internal vibratory motor has an eccentric weight attached to a shaft with said shaft and said weight being configured and positioned to cause said housing to physically move against adjacent portions of the boat during time periods when said vibratory motor is in operation so as to create a second source of vibration for repelling and deterring birds from landing on and roosting in the mast, spreaders, rigging, masthead appendages, towers, and outriggers of the boat.

10. A vibrating device that quietly repels and deters birds from landing on the mast, spreaders, rigging, or masthead appendages, towers, and outriggers of sailboats and power boats, whereby the vibrations thereof are generated by an internal unbalanced vibratory motor that is rigidly fixed within a tethered housing and wherein said vibrating device further comprises a repeat cycle controller means adapted to make said vibrations cyclical.

11. The device of claim 10 wherein said controller means comprises a light controlled repeat cycle timer having a photocell that turns said timer on when sunlight is present and turns said timer off when ambient conditions become dark.

12. The device of claim 11 wherein said light controlled repeat cycle timer is energized for 15 seconds, and then turned off for 30 seconds and repeats this cycle continuously until said timer is deactivated by lack of sunlight.

13. The device of claim 11 wherein said vibratory motor and said light controlled repeat cycle timer are powered by 12-volt direct current supplied by onboard batteries.

14. The device of claim 11 further comprising a power cord connected to said vibratory motor and said light controlled repeat cycle timer wherein said power cord has connection means to onboard boat batteries selected from a group consisting of 12-volt direct current plugs configured and dimensioned to plug into a 12-volt receptacle and battery clips which can be connected directly to onboard boat batteries.

15. The device of claim 11 wherein said housing is translucent and is configured to protect said internal vibratory motor and said light controlled repeat cycle timer from weathering elements.

16. The device of claim 10 wherein the vibrations caused by said vibratory motor are transmitted to the masts, spreaders, rigging, masthead appendages, towers, and outriggers of sailboats and power boats through a resilient collar.

17. The device of claim 16 wherein said collar is made from materials selected from a group consisting of rubber materials and synthetic rubber materials.

18. The device of claim 10 wherein said housing is translucent and said photocell is positioned within said housing.

19. A method for repelling and deterring birds from landing on the mast, spreaders, rigging, or masthead appendages of a sailboat, or the towers and outriggers of a powerboat, said method comprising the steps of:

providing an internal unbalanced vibratory motor, a tetherable housing with a resilient collar through which vibrations can be transmitted, tethering means, repeat cycle controller means adapted to make said vibrations cyclical, electrical connection means, and a boat having at least one upper structure capable of vibration and upon which birds would be expected to land;

rigidly fixing said motor within said housing;

using said electrical connection means to electrically connect said motor to said repeat cycle controller means; and using said tethering means to place said housing in vibratory contact with said at least one upper structure of said boat so that during pre-determined periods of time when said repeat cycle controller means activates said internal unbalanced vibratory motor to produce cyclical vibrations as a frightening stimulus for birds to repel and deter them from landing on and attempting to roost on said at least one upper structure, with said unbalanced motor also causing said housing to physically move against adjacent portions of the boat during time periods when said vibratory motor is in operation so as to create a second source of frightening stimulus for repelling and deterring birds from landing on and attempting to roost on said at least one upper structure of said boat.

20. The method of claim 19 wherein said housing is translucent and said repeat cycle controller means comprises a light controlled repeat cycle timer having a photocell that turns said timer on when sunlight is present and turns said timer off when ambient conditions become dark.

* * * * *